United States Patent [19]

Baker

[11] Patent Number: 5,428,349
[45] Date of Patent: Jun. 27, 1995

[54] NONDISCLOSING PASSWORD ENTRY SYSTEM

[76] Inventor: Daniel G. Baker, 6982 SW 184th, Aloha, Oreg. 97007

[21] Appl. No.: 955,145

[22] Filed: Oct. 1, 1992

[51] Int. Cl.⁶ .............................................. H04K 1/00
[52] U.S. Cl. ........................... 340/825.3; 340/825.31; 380/23; 235/382.5
[58] Field of Search ................... 340/825.31, 825.32, 340/825.34, 825.3, ; 380/23, 25, 28, 44; 235/382.5; 361/172

[56] References Cited

U.S. PATENT DOCUMENTS

| | | | |
|---|---|---|---|
| 3,812,403 | 5/1974 | Gartner | 361/172 |
| 4,184,148 | 1/1980 | Smagala-Romanoff | 340/825.340 |
| 4,819,267 | 4/1989 | Cargile et al. | 380/23 |
| 4,857,914 | 8/1989 | Thrower | 340/825.310 |
| 5,056,141 | 10/1991 | Dyke | 380/25 |
| 5,177,789 | 1/1993 | Covert | 380/23 |
| 5,251,259 | 10/1993 | Mosley | 380/23 |
| 5,276,314 | 1/1994 | Martino et al. | 340/825.310 |

OTHER PUBLICATIONS

Communications of the ACM, Jul. 1964, p. 420 named Algorithm 235, Random Permutation.

*Primary Examiner*—Donald J. Yusko
*Assistant Examiner*—Edward Merz

[57] ABSTRACT

A password access method/algorithm is effected by generating a pseudorandom array of each letter of the alphabet and the numerals 0 through 9 such that the password entry can be monitored without disclosing the letters or numerals contained in the password. The preferred arrangement is a square matrix of six rows and six columns of characters. The user enters the password by selecting either the row or column containing each letter of a memorized password.

15 Claims, 4 Drawing Sheets

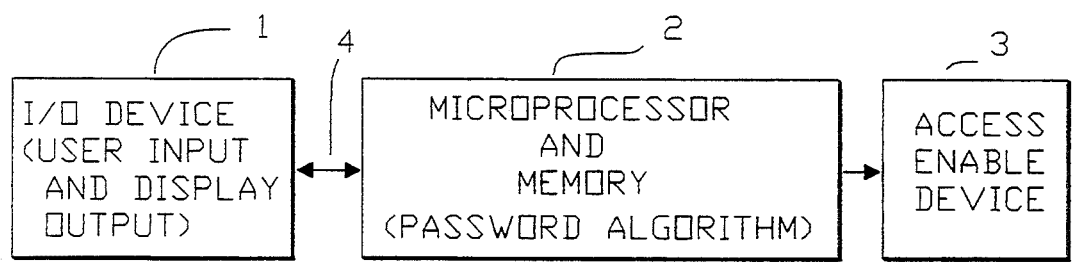
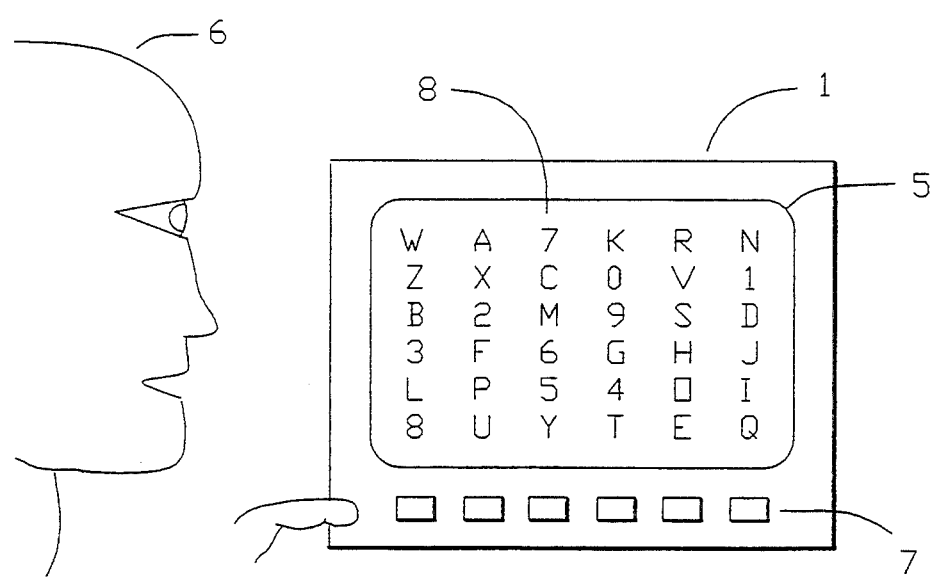

NONDISCLOSING PASSWORD ENTRY SYSTEM

BACKGROUND OF THE INVENTION

This invention relates generally to limited access systems employing password entry to limit access to authorized personnel and more particularly to those systems where the password can be obtained by unauthorized personnel by observing or otherwise monitoring password entry.

The growing use of electronic keypads to replace traditional, mechanical lock and key systems provides added convenience for access to homes, cars, offices and the like. However, the security of many of these systems can be compromised. For example, most systems use a password or entry code to limit access and, in many situations, an unauthorized person may learn the password by watching and recording the entry of the password by an authorized person. The system is then vulnerable until the password can be changed requiring the users to learn new and often multiple passwords. Security doors in open and populated areas (e.g. airports, businesses, and military facilities) are particularly vulnerable.

Methods other than password entry exist and some use personal identification methods to determine authorized user access. For example, systems such as retinal or finger print scanning and the like provide a high degree of security, but are often more costly and less convenient than a password entry system. Particularly when authorized personal are denied access.

Computer systems also use password entry to maintain security and, in addition to direct observation of the user keystrokes, are vulnerable to password disclosure in at least two ways. Firstly, in the case where a remote terminal and modem are used to communicate with a main computer, the communication line can be monitored and the characters entered by the user recorded to determine the password. This is particularly important when remote terminals are used for financial transactions since substantial monetary loss could be incurred by unauthorized access to the system. Secondly, the keystrokes of the user could be monitored with an unauthorized software program to determine the password as in the case of a computer network such as a LAN (Local Area Network).

What is desired is a password entry method where the password is not directly input by the user or transmitted by the remote terminal. This method should employ a convenient algorithm for password entry and when used in conjunction with a user input and display device would not disclose the user password by any of the aforementioned monitoring techniques.

SUMMARY OF THE INVENTION

The present invention has been made in consideration of the above situations. Accordingly, a primary object of the present invention is to provide a display and input device utilizing a password entry method which does not require the direct entry of the memorized password characters and is not subject to the aforementioned disadvantages.

According to the present invention, a display of a randomized matrix of alphanumeric characters is created for the user on a display device. The user visually scans the display and then selects the column (or, in an equivalent representation, the row) containing the first character of the memorized password. The matrix is rerandomized and the process continued until the entire password has been entered. Since the successive characters of the memorized password appear with equal probability in columns or rows of the matrix, the actual columns or rows selected are most likely different each time the password is entered. Further, due to the plurality of characters in the selected column or row, the recording of both the displayed matrix and the user inputs does not disclose the memorized password making this method and apparatus particularly useful.

An embodiment of the present invention is described, by way of example only, wherein other objects and advantages will become apparent when read with reference to the appended drawings. The scope of these objects and advantages is more particularly pointed out and indicated in the appended claims.

BRIEF DESCRIPTION OF THE DRAWINGS

The accompanying drawings show one of the preferred embodiments of the invention in which, FIG. 1 is a block diagram of a typical secured access system where upon correct entry of the password, the user is permitted access;

FIG. 2 is a detailed illustration of a preferred I/O display of FIG. 1;

DESCRIPTION OF THE PREFERRED EMBODIMENT

Figure 3:
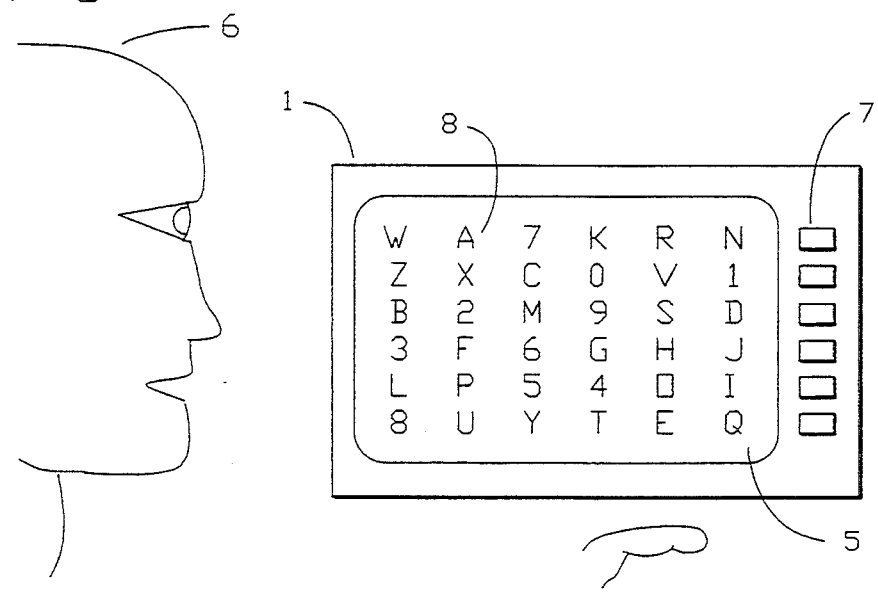
FIG. 3 is an alternative illustration of a preferred I/O display of FIG. 1.

A password algorithm according to the present invention is implemented with the apparatus shown in FIG. 1 wherein is illustrated a block diagram of a typical secured access system.

The user communicates with the microprocessor 2 through an input/output or I/O device 1. The communications path 4 is, in the simplest form, a short and direct parallel wire connection to the microprocessor 2. It will be appreciated that other communication methods exist which may be more or less vulnerable to unauthorized monitoring or tapping the details of which are not important to the present invention. Upon successful completion of the password entry, the access enable device 3 is enabled by the microprocessor. The access enable device 3 could be, for example, an electric lock on a door through which only authorized personnel may pass.

The I/O device 1 is shown in more detail in FIG. 2. It consists of a display 5 controlled by the microprocessor and memory 2 which implements the password algorithm and displays a random array of characters 8 consisting of six columns of six characters each. The thirty-six characters 8 represent the twenty-six letters of the alphabet plus the integers zero through nine. Below each of the six columns is a button 7 connected to the microprocessor and memory 2. According to the present invention the memorized password entry procedure is as follows: The user 6 scans the display for the column containing the first character of the memorized password. Once the column is found, the button 7 just below that column is pressed. The microprocessor and memory 2 then rerandomize the characters 8 and the process continues until all the characters of the password have been entered. If, after a predetermined number of trials, the correct buttons have been pressed, the microprocessor and memory 2 then activate the access enable device 3.

FIG. 3 illustrates an alternate form of the I/O device 1 in which the user searches for the row, rather than the column, containing each character of the memorized password. Otherwise, this is the same as FIG. 2.

Figure 4:
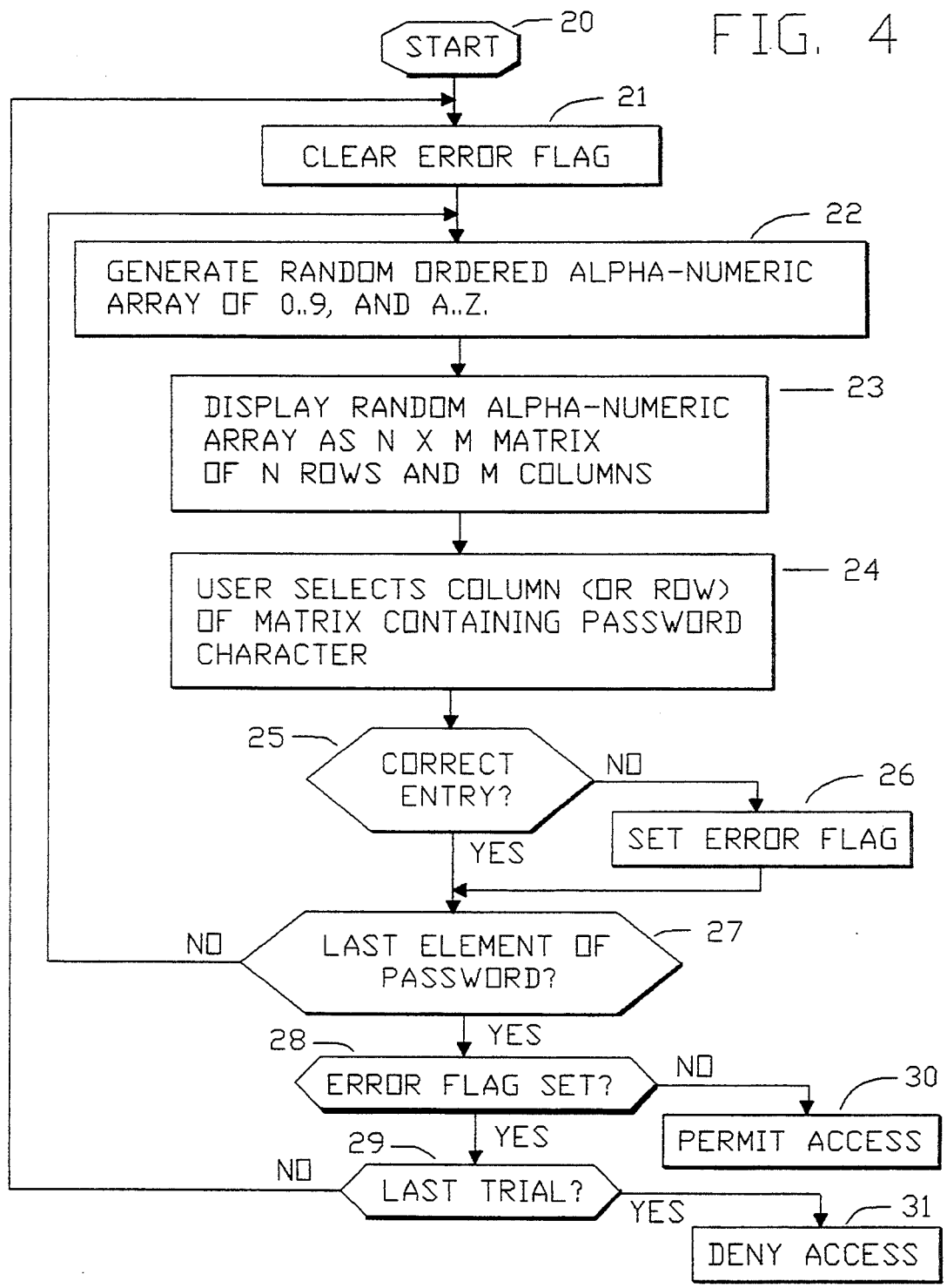
FIG. 4 is a flow diagram of the algorithm implemented by the microprocessor and memory of FIG. 1.

The password entry algorithm implemented by microprocessor and memory 2 is described by means of a flow chart in FIG. 4. From the start block 20 an error flag is cleared 21. This error flag will be used later to determine correct entry of each character of the memorized password. A pseudorandom algorithm is used 22 to randomly order the integers zero through nine and the letters A through Z. The nature of the particular pseudorandom algorithm is important only to the extent that it has a nearly uniform distribution such that all the possible sequences of the alphanumeric characters occur with nearly equal likelihood. Many pseudorandom number generator algorithms meet this criterion, the details of which are not important to the present invention utilizing the present password entry algorithm. The randomly ordered characters are then displayed 23 in an N by M matrix where N times M is thirty-six. A six by six matrix is used in the preferred embodiment although a nine by four and four by nine matrix are other possible arrangements.

At this point, block 24 of FIG. 4, the user selects a column as in FIG. 2 or a row as in FIG. 3. The column or row selected should contain the first letter of the memorized password. In 25 a stored version of the correct password is used to determine which column contains the first letter of the correct password. The button pressed is checked in 25 and if it does not correspond to the correct column the error flag is set 26. A check is made in 27 for the last character of the password. If it is not the last, the matrix is rerandomized in 22 and the process repeated until all characters have been entered.

A check of the error flag is made in 28 and if it is not set, access is permitted. If the error flag is set, then at least one error was made in the password entry and a check is made for the last trial in 29. A typical number of trials would be three to allow for two mistakes in password entry by an authorized user. Allowing more trials than three would allow random selection of the columns by an unauthorized user an increasing probability of access. After the third pass through 29, the last trial is detected and access is denied in block 31. At this point the system would wait a predetermined time before returning to the start 20 of the flowchart.

Since, at each selection by the user of a column, six characters are revealed, an unauthorized observer cannot uniquely determine the correct password. Further, and for the same reason, monitoring the channel 4 in FIG. 1 to determine the button selections and display information will not reveal the user password.

An unauthorized user could randomly select columns with a probability of $(1/6) \wedge K$, where K is the number of characters in the password. For a four and six character password the probabilities of unauthorized access are 1:1296 and 1:46,656 respectively. Also, the unauthorized user could record the display after each column entry by the authorized user and randomly select one of the six characters in each of the selected columns. Once again, the probability of unauthorized access is $(1/6) \wedge K$.

Other character matrix configurations are possible. For example, the thirty-six alphanumeric characters could be arranged in nine columns of four characters each or four columns of nine characters each. The probability of unauthorized access is reduced to $(\frac{1}{4}) \wedge K$ for each case.

The optimal tactic by an unauthorized user to attain this probability in the nine column by four row system is to observe or otherwise record the display for each column selection by an authorized user and randomly select one of the four characters from each correctly selected column. The unauthorized user then selects the columns containing these characters to optimize the probability of access.

For the four column by nine row method, the optimal tactic by an unauthorized user is to just randomly select one of the four columns. Each tactic optimizes the unauthorized users probability of access for that configuration. The six by six configuration described earlier is preferred although, where it is unlikely that the operation will be observed, the nine column by four row method provides the best security from random column selection (ie. $1/9 \wedge K$ or 1:531,441 for a six character password).

Figure 5:
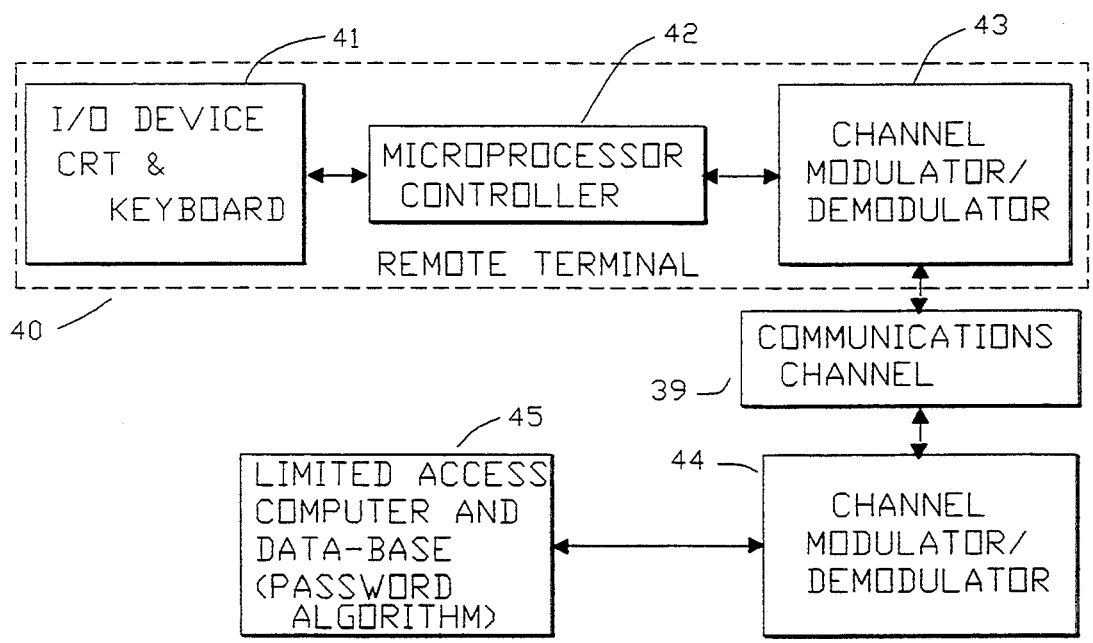
FIG. 5 is a block diagram of an alternative exemplary embodiment of the present invention utilizing a remote terminal and communications channel.

A further exemplary embodiment is shown in FIG. 5 wherein a remote terminal 40 allows user access to a limited-access computer and data base 45. The access is via a communications channel 39 such as a telephone line which is vulnerable to monitoring by unauthorized personnel. The password algorithm of the present invention described earlier and specifically diagrammed in FIG. 4, is implemented by the main computer 45. The display 41 is as described earlier and shown in FIG. 2 and 3. Controller 42 controls the user input and display 41 to allow communication via a conventional, channel modulator/demodulator 43. The aforementioned advantages of the present invention apply to the unauthorized monitoring, such as a phone-tap, of the communication channel 39.

Figure 6:
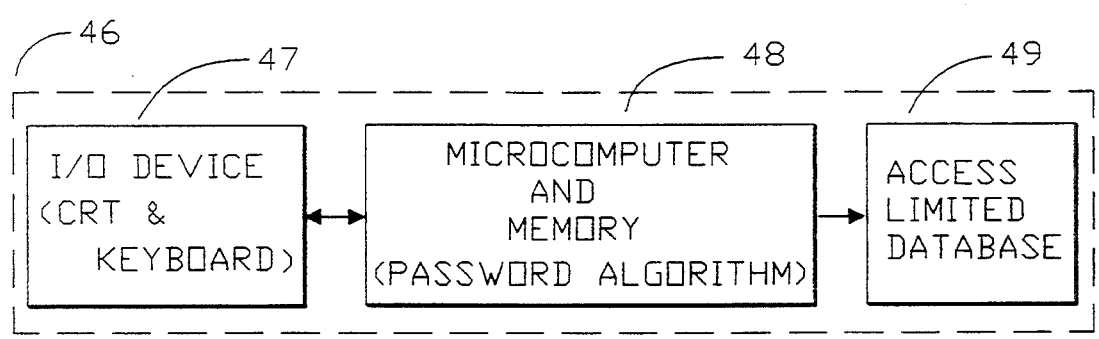
FIG. 6 is a block diagram of an alternative exemplary embodiment of the present invention as a self-contained system.

A further exemplary embodiment is shown in FIG. 6 wherein the I/O device 47, microcomputer and memory 48, and limited-access database 49 comprise a self-contained system such as a personal computer. The password algorithm of the present invention described earlier and specifically diagrammed in FIG. 4, is implemented by the microcomputer and memory 48. Password entry is vulnerable to monitoring by unauthorized personnel by watching or otherwise recording password entry via keyboard and display contained in I/O device 47 and the aforementioned advantages of the present invention apply.

Although the invention is described with respect to a preferred embodiment, modifications thereto will be apparent to those skilled in the art. Therefore, the scope of the invention is to be determined by reference to the claims which follow.

I claim:

1. A method for prompting a user to enter input corresponding to a predetermined password, said method comprising the steps of:

(a) generating a random matrix of characters, said matrix having n rows and m columns;

(b) displaying said random matrix;

(c) accepting from the user a selection of one of said columns of said random matrix;

(d) determining if a first character of said password is in said one of said columns selected by the user and accepted in step (c) ; and (e) repeating steps (c) and (d) for a second character of said password.

2. The method of claim 1, wherein said random matrix contains n×m unique characters.

3. The method of claim 2, wherein said random matrix contains 26 letters of the alphabet and 10 digits.

4. The method of claim 3, wherein n equals m equals six.

5. The method of claim 1, further comprising performing the following steps after step (d) and before step (e):

rerandomizing said random matrix; and displaying said random matrix.

6. A method for prompting a user to enter input corresponding to a predetermined password, said method comprising the steps of:

(a) generating a random matrix of characters, said matrix having n rows and m columns containing n×m unique characters;

(b) displaying said random matrix;

(c) accepting from the user a selection of one of said columns of said random matrix;

(d) determining if a first character of said password is in said one of said columns selected by the user and accepted in step (c);

(e) repeating steps (a) through (d) for each character of said password;

(f) if each determining step (d) results in a positive conclusion, enabling access.

7. The method of claim 6, wherein said random matrix contains 26 letters of the alphabet and 10 digits.

8. The method of claim 6, wherein n equals m equals six.

9. A password access system for accepting from a user a predetermined password, said system comprising:

(a) generating means for generating a randomly-ordered matrix of characters, said matrix having n rows and m columns;

(b) a display receiving said matrix from said generating means and displaying said random matrix;

(c) selection means for accepting from the user a selection of one of said columns of said random matrix; and (d) control means for determining if a first character of said password is in a column selected by the user using said selection means.

10. The password access system of claim 9, wherein said selection means includes a plurality of buttons, with each one of said buttons corresponding to a respective one of said columns of said matrix displayed by said display.

11. The password access system of claim 9, wherein said selection means is a data display and a keyboard associated with a computer.

12. The password access system of claim 9, wherein said display is a data display associated with a computer.

13. The password access system of claim 9, wherein said matrix contains n×m unique characters.

14. The password access systems of claim 13, wherein said matrix contains 26 letters of the alphabet and 10 digits.

15. The password access system of claim 14, wherein n equals m equals six.

* * * * *